United States Patent Office 2,967,108
Patented Jan. 3, 1961

2,967,108

PREPARATION OF MISO

Allan K. Smith, Clifford W. Hesseltine, and Kazuo Shibasaki, Peoria, Ill., assignors to the United States of America as represented by the Secretary of Agriculture No Drawing. Filed July 24, 1959, Ser. No. 829,467

1 Claim. (Cl. 99—98)

(Granted under Title 35, U.S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the production of the food product miso and related products prepared from rice and soybeans in which the soybeans are fermented in the form of grits by microorganisms.

This invention concerns the production of the food, miso, and related substances by the fermentation of soybean grits with appropriate osmophilic microorganisms. Heretofore, the traditional Japanese food has been prepared by the fermentation of whole soybeans which were inoculated with microorganisms present in a previous good miso fermentation.

Miso, a fermented soybean-rice preparation has been used for a long time as a valuable and important food in Japan. It contains proteins, carbohydrates, fats, vitamins and other nutrients. This food has been prepared by soaking and cooking rice which is then spread into trays and inoculated with viable spores of suitable strains of *Aspergillus oryzae*. The rice is allowed to be covered with mold mycelium. The purpose of the mold rice is to furnish a source of enzymes for the breakdown of proteins, fats and carbohydrates during the soybean fermentation. At the same time, soybeans are washed, soaked in water for a number of hours and cooked with steam. The mold rice and cooked soybeans are put together with the addition of salt and inoculated with miso from a previous fermentation. The whole mass is then ground together in order to disperse the salt and inoculum with the rice and soybeans. This moist mixed substrate is then placed in barrels or other suitable containers, pressed down tightly and allowed to incubate. No aeration is used during the fermentation which lasts for three months or longer. In some instances incubators with a temperature of 35°–40° C. are used; in other commercial operations the fermentation is carried on out-of-doors. Temperature varies with the seasons. When the fermentation is completed the fermented material is allowed to mature or age at room temperature for several months. At the time of harvest, the aged and fermented product is ground into a thick paste which is then sold as a finished food product.

Miso contains, as the chief chemical components: 48–50 percent water, reducing sugars 6–25 percent, protein 9–15 percent, acids 0.4–0.8 percent, oils 1.8–6.67 percent and salt 4.0–13 percent. This food is used, with additions of precipitated soybean protein and vegetables, to prepare miso soup, a food used daily as a breakfast food in Japan. Miso is also used, because of the pronounced pleasant flavor to add to vinegar, sugar, etc. for dressings for fish, vegetables, tofu, beef, pork and poultry. Miso is used as a pickling agent for certain vegetables. Miso soup, being very nutritious, is sometimes used as a weaning food for babies.

The miso fermentation and manufacture has a number of very objectionable features. The finished miso has unsightly spots due to use of soybeans which have black or dark colored hilums or colored seed coats. The general appearance of the product is also darkened due to these pigments in the final product. In many varieties of soybeans undesirable flavors and odors are encountered and these appear to be abundant in the seed coats of the soybeans. Whole soybeans are soaked and cooked for long periods of time required for softening the beans. Even more undesirable is the fact that many soybeans during the soaking and cooking processes do not take up water uniformly. Some beans remain completely hard. Thus, beans to be fermented are not uniform in moisture or softness and during the fermentation these hard soybeans do not ferment properly. The product therefore is not uniform in texture, appearance, or taste, at the end of the fermentation.

Another objectionable feature in the manufacture of miso is the long fermentation time and resultant expenses of having many tanks and a great deal of space tied up during fermenting. This occurs, even though in the traditional process, the rice, inoculum, soybeans and salt are thoroughly ground together to get optimum dispersal, reduction in size and thorough seeding of the substrate by the osmophilic microorganisms. The final product has also an objectional material in the form of insoluble fragments of hulls which are not completely digested even during the long period of fermentation. All of these objections are overcome by this invention.

The seed coat of soybeans is stated to contain about 7 percent protein while the cotyledons which make up 90 percent of the soybean has about 41 percent protein. The seed coat of soybeans has been found to contain 17–20 percent pectin, 5.6–10.3 percent hemicellulose, 51.9 percent crude fiber, 11 percent $\alpha$-cellulose, 0.90 percent crude fat and 4.3 percent ash based on a dry-weight basis.

In making miso, mixtures of ingredients are varied depending on the type of miso desired. Typically, mold rice is added in a range of 40–60 percent, soybeans from 40–60 percent, and salt from 10–14 percent.

In the traditional miso fermentation the whole soybeans are washed and soaked in water for periods of 12–18 hours in order to hydrate them prior to cooking. Even with periods of soaking of this length, some beans do not absorb water and, therefore, do not cook well. The soaked soybeans are then cooked for periods of up to 2 hours at 10 lbs. pressure. The fermentation time in making miso varies from 3 months to 1 year depending on the temperature and the type of miso desired.

It has been firmly believed that the desired fermentation of miso requires inoculation from a miso fermentation containing both yeasts and lactic bacteria. We have now discovered that the latter organisms are completely unnecessary for the preparation of miso and that the yeasts alone are responsible for the development of the specifically demanded flavor. Accordingly, it is obvious that pure cultures of the specific Saccharomyces organisms, which are defined below, may be used in place of an inoculum from an active miso fermentation.

We have also discovered that removal of the soybean hulls prior to the use of the beans greatly accelerates the subsequent fermentation, apparently by the removal of substances which inhibit the activity of the organisms or of their products.

In this invention the soybeans are cleaned and then cracked by a roller-type crusher or other suitable apparatus. This effectively breaks the hulls from the embryo and cotyledons. The hulls can then be readily removed or separated from the remainder of the soybeans. The part of the soybean free of the hulls is referred to as grits. In this process the grits represent approximately 2 to 10 pieces of the seed minus the hulls. If the grits are crushed into fine particles they do not ferment as well as if they are divided only into a few pieces. The coarse grits are then soaked in water. For example, 40 grams of grits when soaked in 60 grams of water for 5 hours and cooked are quite soft and have a light color. Actually it has been found that soaking grits to absorb water requires only approximately 1 hour although we have used periods up to 5 hours with similar results. When coarse and fine grits were soaked in water, it was found that maximum water absorption had occurred within 2 hours and 20 minutes regardless of the size of the grits.

According to this invention, grits, after soaking for a short time in water, are cooked very rapidly and uniformly. For example, when grits were soaked for 1.5 hours and cooked with steam for 40–60 minutes at 7 lbs. pressure, they were uniformly soft, rather elastic and uniformly cooked and possessed a highly desirable light color. When cooked for 90 minutes some darkening occurred. Besides preparing the beans for a rapid fermentation, the soaking and cooking effectively destroy microorganisms associated with the soybeans.

In this invention about 26.7 to 41.6 parts of the cooked soybean grits are cooled and mixed with about 12.3 to 16.7 parts of *Aspergillus oryzae* mold rice, about 1.7 to 3 parts of water, and about 4.3 to 8 parts of salt, and are inoculated with osmophilic microorganisms adapted for growth and fermentation in this substrate. One part of inoculum is taken from a previously good miso fermentation containing *Saccharomyces rouxii* (NRRL Y-2547 and Y-2548) and mixed thoroughly with the soybean grits, mold rice, water and salt. This well mixed material is then placed in suitable fermentation vessels.

This invention uses microorganisms which can tolerate high salt concentrations and which grow under nearly anaerobic conditions at temperatures up to 40° C. These osmophilic microorganisms belong to species of the yeast genus Saccharomyces. These microorganisms ferment the rice and soybean grits and the products formed by the enzymatic action of the mold rice to form a variety of fermentation products such as glutamic acid, lactic acid, succinic acid, ethyl alcohol, higher alcohols and their esters. Other products formed during the fermentation are amino acids and fatty acids. The fermentation of soybean grits according to the invention is carried out in the presence of suitable sources of water, carbohydrates, nitrogen and salt concentrations up to approximately 14 percent.

According to this invention, osmophilic yeasts are utilized to ferment soybean grits with temperature ranges from room temperature to 40° C. The fermentation of grits is carried out in closed containers with no aeration except for the air in the fermentation container in contact with the tightly packed substrate. Fermentation vessels are kept closed during the fermentation but no accumulation of gas occurs. In addition to maintaining these conditions, waxed paper or other suitable nontoxic films are placed over the fermenting rice and soybean grits to prevent the growth of undesirable aerobic microorganisms on the surface of the fermenting substrate.

In this invention using soybean grits, we have discovered that even though the old and inefficient process for making miso included mashing the whole beans before fermentation, in our invention the fermentation of soybean grits proceeds at a greatly accelerated rate. This has reduced the fermentation time by at least 50 percent. It is believed that the removal of the hulls at the beginning of the process has removed a compound or compounds which inhibits or reduces growth and fermentation abilities of the osmophilic microorganisms used in the fermentation. For instance, it is known that flavenoids occur in soybeans and that this class of compounds are enzyme inhibitors.

In this invention using soybean grits the final product after fermentation and aging is more uniform in color, and consistency. The color is a pleasant light color and has a pleasant odor and flavor. Since soybean grits were used and the more fibrous portion of the seed removed, the product is higher in protein. At the same time bad tastes and odors often associated with typical miso fermentations have been eliminated. These advantages have been accomplished in this invention with a corresponding reduction in manufacturing time and a reduction in soaking and cooking which has brought about the production of a superior food product at a reduced processing cost.

For the purpose of illustrating the invention certain specific examples are set forth here below. It is to be understood that these specific examples are to illustrate only certain embodiments of the general invention and that marked variations may occur from the preferred examples and still give satisfactory results.

*Example 1*

In this fermentation soybeans of the variety Hawkeye were used. The beans were crushed by a roller type crusher into grits. The size of sieve was 11/64 inch round hole and it had a 4 x 22 inch slot. Grits prepared from this variety weighed 4,994 gms. The grits were soaked in 17,500 ml. of tap water for 1 hour and 40 minutes and the excess water drained leaving 11,849 grams of wet grits. The grits were then cooked with steam at 7 lbs. for 1 hour. The weight of the grits were then 10,917 grams and had a moisture content of 59.3 percent. They were soft, uniform in texture, yellow colored and good in appearance. One thousand grams of the above described grits were then mixed with 370 grams of mold rice, 200 grams of NaCl and 70 ml. of tap water, and inoculated with 30 gms. of good miso from a previous fermentation. The mixture was then packed tightly into a suitable fermentator. The fermentation was allowed to go for 7 days at 28° C. and then kept for 2 months at 35° C. No aeration was supplied. The fermentation was completed at this time and the miso allowed to age for 2 weeks at room temperature. The miso was then ground into a thick paste and this product had excellent appearance, excellent flavor and taste, and had an excellent odor.

*Example 2*

The soybeans were made into grits, soaked and cooked as in Example 1. Eight hundred grams of these grits were mixed with 500 grams of mold rice, 130 gms. of NaCl and 50 ml. of tap water. The whole mixture was then seeded with 30 grams of inoculum taken from a previously good miso fermentation. The thoroughly mixed material was placed in a suitable fermentation vessel, the lid placed on the container and the fermentation allowed to proceed for 1 week at 28° C. At the end of this time the fermentor was placed at 35° C. and the fermentation allowed to continue for 3 weeks. At this time the fermentation was complete and the miso was allowed to age for 1 week at room temperature. The miso was then ground into a paste. This miso had an excellent appearance, excellent flavor and odor and a light color.

*Example 3*

A pilot plant fermentation was prepared from grits from the soybean variety Hawkeye. The grits were prepared as in Example 1. Five kg. of soybean grits were sprayed with 7.5 liters of tap water and allowed to stand for 2.5 hours with occasional stirring. This batch was cooked with steam for 1 hour at 5 lbs. of pressure. The weight after cooking amounted to 10.407 kilos with a moisture content of 57.2 percent. The grits then were very soft, uniform in appearance and had a pleasing yellow color. To the cooked grits were added approximately 4.0 kilos of mold rice, 2 kilos of NaCl and 0.75 kilo of water.

The mixed substrate was then inoculated with 0.25 kilo of miso from a previous good fermentation. The material was then placed in a large stainless steel tub, covered with a plastic, nontoxic film, and allowed to stand for 7 days at 28° C. and removed to an incubator at which the temperature was held for 2 months at 35° C. At the end of this time the fermentation was complete and the fermentor removed to room temperature for 2 weeks of aging. The finished product yielded approximately 17 kilos of miso which had an excellent color, excellent flavor and excellent odor.

Having fully disclosed our invention, what we claim is:

A method of preparing miso comprising dehulling Hawkeye variety soybeans, cracking the dehulled soybeans into coarse grits, soaking the coarse grits for about 1 to 5 hours, cooking the soaked grits for 40 to 60 minutes at 5 to 7 pounds' pressure, mixing one part of inoculum containing organisms selected from the group consisting of *Saccharomyces rouxii* NRRL Y-25547 and *Saccharomyces rouxii* NRRL Y-2548 with about 26.7 to 41.6 parts of the cooked soybean grits, about 12.3 to 16.7 parts of *Aspergillus oryzae* mold rice, about 4.3 to 8 parts of sodium chloride, and about 1.7 to 3 parts of water, fermenting the mixture first for 1 week at 28° C. and then for from 3 weeks to 2 months at 35° C., and aging the resulting miso for 1 to 2 weeks at room temperature.

References Cited in the file of this patent

Markley: "Soybeans and Soybean Products," vol. II, 1951, Interscience Publishers, Inc. (New York), pages 1001, 1002.